(12) United States Patent
Jaamour et al.

(10) Patent No.: US 7,721,154 B1
(45) Date of Patent: May 18, 2010

(54) SYSTEM AND METHOD FOR SOFTWARE RUN-TIME TESTING

(75) Inventors: Rami Jaamour, Pasadena, CA (US); Jeehong Min, Pasadena, CA (US); Thomas Macario Pasana Tabanao, Burbank, CA (US)

(73) Assignee: Parasoft Corporation, Monrovia, CA (US)

( * ) Notice: Subject to any disclaimer, the term of this patent is extended or adjusted under 35 U.S.C. 154(b) by 413 days.

(21) Appl. No.: 11/849,907

(22) Filed: Sep. 4, 2007

Related U.S. Application Data (60) Provisional application No. 60/824,583, filed on Sep. 5, 2006.

(51) Int. Cl.
G06F 11/00 (2006.01)
(52) U.S. Cl. .................................................... 714/38
(58) Field of Classification Search .................. 714/18, 714/21, 26, 32, 33, 37–39, 47
See application file for complete search history.

(56) References Cited

U.S. PATENT DOCUMENTS

| | | | | |
|---|---|---|---|---|
| 5,909,545 A | * | 6/1999 | Frese et al. | 709/208 |
| 6,637,020 B1 | * | 10/2003 | Hammond | 717/107 |
| 7,043,549 B2 | * | 5/2006 | Breese et al. | 709/224 |
| 7,185,237 B2 | * | 2/2007 | Stephenson et al. | 714/47 |
| 7,316,014 B2 | * | 1/2008 | Cao | 717/169 |
| 2003/0145079 A1 | * | 7/2003 | Breese et al. | 709/224 |
| 2004/0068560 A1 | * | 4/2004 | Oulu et al. | 709/224 |
| 2004/0215762 A1 | * | 10/2004 | Oulu et al. | 709/223 |
| 2004/0230954 A1 | * | 11/2004 | Dandoy | 717/124 |
| 2005/0114870 A1 | * | 5/2005 | Song et al. | 719/328 |
| 2005/0246588 A1 | * | 11/2005 | Deng et al. | 714/38 |
| 2006/0064399 A1 | * | 3/2006 | De Sio | 707/1 |

OTHER PUBLICATIONS

Saff, David et al., "Automatic Test Factoring for Java", MIT Computer Science and Artificial Intelligence Lab, ASE '05, Nov. 7-11, 2005, Long Beach, California, USA, 10 pp.

* cited by examiner

*Primary Examiner*—Nadeem Iqbal
(74) *Attorney, Agent, or Firm*—Christie, Parker & Hale LLP.

(57) ABSTRACT

A method and system for run time testing of a computer software application. The method and system include attaching a RAS agent to the application to be tested; running the application with the attached RAS agent; configuring the RAS agent to monitor a component of the application, while the application is being executed to collect results; exercising the application to perform a task; and validating the collected results while the task is being performed by the application. The RAS agent may be configured (for example, remotely) to modify behavior of the component of the application, while the application is being executed.

20 Claims, 5 Drawing Sheets

SYSTEM AND METHOD FOR SOFTWARE RUN-TIME TESTING

CROSS-REFERENCE TO RELATED APPLICATIONS

This Patent Application claims the benefit of the filing date of U.S. Provisional Patent Application Ser. No. 60/824,583, filed Sep. 5, 2006, and entitled "System And Method For Software Run-Time Testing," the entire content of which is hereby expressly incorporated by reference.

TECHNICAL FIELD

This application relates generally to testing computer software; and more particularly to a system and method for run time testing of a computer software application.

BACKGROUND

Before the rise of modern enterprise software architecture, business systems were typically implemented as a single monolithic piece of software, responsible for processing all functions of the business. This practice resulted in "information silos" that were inflexible, costly to maintain, and most importantly, difficult to re-use. The desire for software re-use led to component-based and, later, service-based architecture which decomposed monolithic software systems into more cohesive units. While leveraging existing software assets has led to increased development efficiency, an important side-effect has been an increase in testing complexity. It is no longer sufficient to simply test the monolithic system in isolation with distributed components—it has become necessary to test at several stages, each at a successively higher level of abstraction. For example:
  unit level—testing individual components or subcomponents to verify correct behavior in isolation.
  integration level—testing a number of components together, but in isolation from the rest of the system, in order to verify that they communicate together correctly
  system level—testing the entire (complete) system of components together to verify the correct holistic behavior of the application.

The tasks of integration and system level testing become increasingly complex because of the heterogeneous components and protocols involved. The typical enterprise application will often employ a database system, a layer of business logic, a messaging bus to communicate asynchronously with other components and services, a presentation layer for users to interact with the system, and any number of middle layers to integrate the numerous components. Because a software tester may not have direct control over any (or all) of these components or subcomponents, a problem of how to create a realistic environment for the system under test to interact with arises.

Therefore, there is a need for a more efficient and robust testing method during software application run-time.

SUMMARY

In one embodiment, the present invention is a method and system for run time testing of a computer software application. The method and system include attaching a Run-time Application Stubs (RAS) agent to the application to be tested; running the application with the attached RAS agent; configuring the RAS agent to monitor a component of the application, while the application is being executed to collect results; exercising the application to perform a task; and validating the collected results while the task is being performed by the application. The RAS agent may be configured (for example, remotely) to modify behavior of the component of the application, while the application is being executed. The component of the application may be one or more methods, functions, or statements.

DETAIL DESCRIPTION

In some embodiments, the present invention is a system and method using Run-time Application Stubs (RAS) for monitoring and/or controlling results of executing methods and/or functions during software application run-time for the purpose of exercising functional tests.

In some embodiments, the present invention is a process that aims at helping software developers and test/quality assurance engineers to simplify functional testing activities of complex, integrated software systems; assist in debugging such systems; and extend the functional test coverage of these systems.

Figure 1:
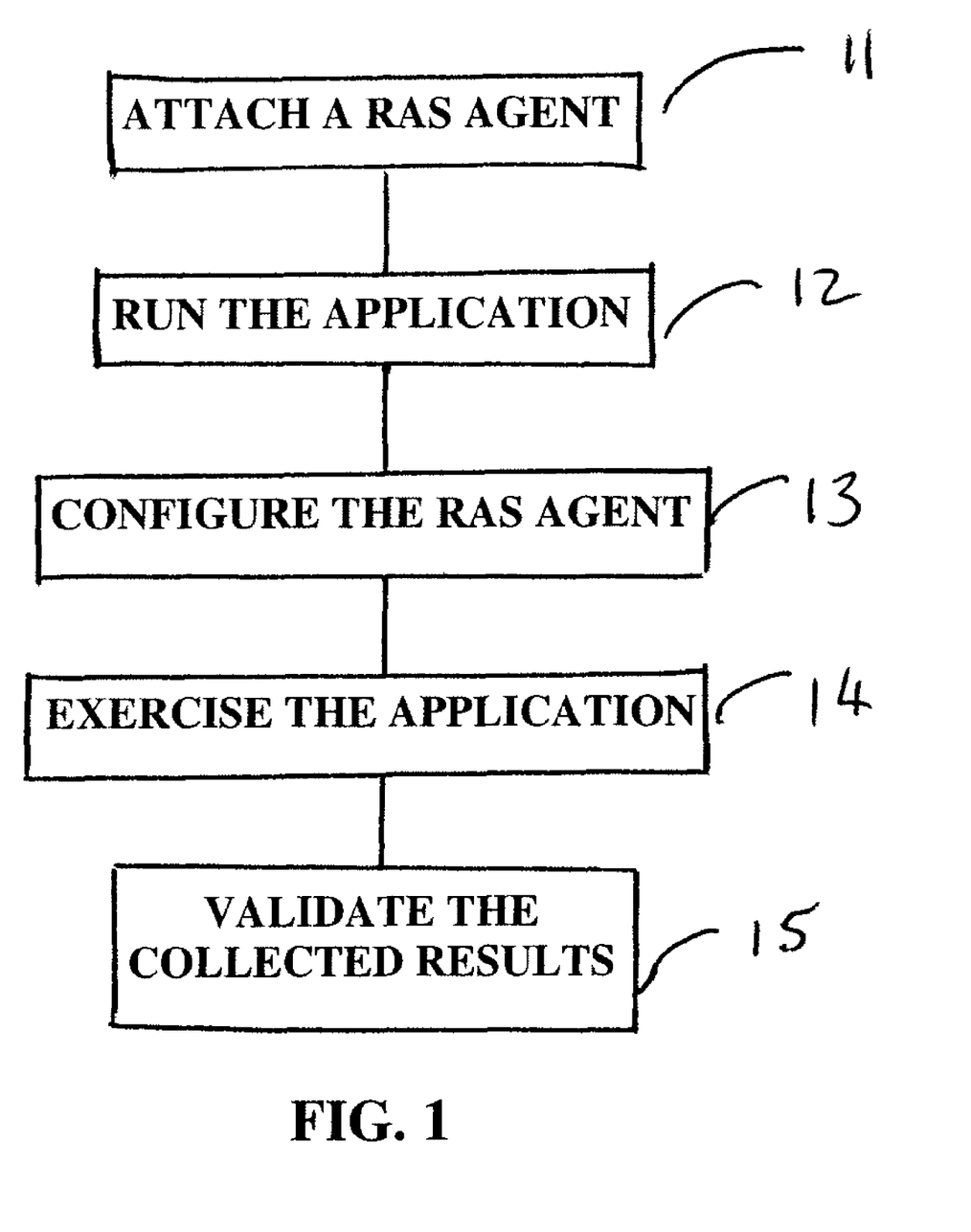
FIG. 1 is an exemplary process flow diagram, according to some embodiments of the present invention.

FIG. 1 depicts an exemplary process flow, according to one embodiment of the present invention. In block 11, a RAS agent is attached to the application run-time virtual machine (Java JRE™ or .NET CLR Common Language Run-time). The application is then run with the attached RAS agent, as shown in block 22. For example, a dynamically linked library file is provided to the run-time executable code to enable a RAS controller to communicate with the RAS agent remotely, once the application is started. For instance, Java JVM™ technology provides a tool interface JVM™ TI (Tool Interface), JVMDI (Debug Interface), or JVMPI (Profiler Interface) in previous JRE releases which allows for agents to hook into the JVM™ for monitoring and management purposes. In one embodiment, the RAS agents are provided as dynamically linked library files (usually .dll on Windows™ platforms, so on UNIX and Linux™) by adding a JVM TI arguments to the java executable used to launch the application, for example:

java-agentlib:ras=opt1,opt2-agentpath:c:/ras.dll.

In some embodiments, the JVMDI is used for the same purpose and in a similar manner. For example, assuming that the RAS agent dll has been added to the operating system PATH environment variable:

java-Dprogram.name=% PROGNAME %-Xdebug-Xrunpmt:monitor=java_package_name,nostart, port=1234

Once the RAS Agent library file is provided to the JVM, it is enabled to control RAS stubs and receive instructions to do so remotely over a socket connection from the RAS controller. A similar mechanism can be used for the Microsoft™.NET Common Language Runtime (CLR) virtual machine.

Figure 4:
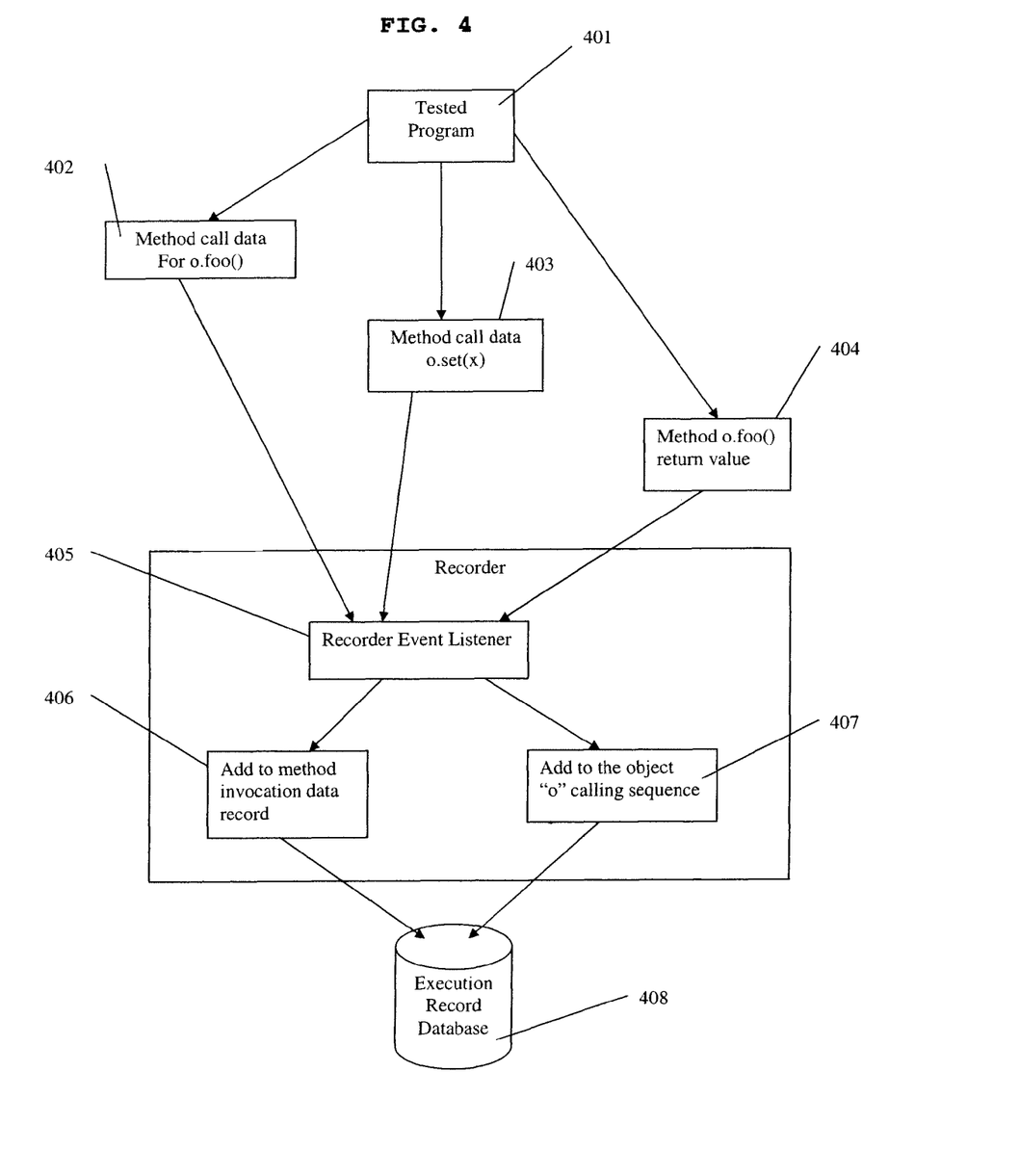
FIG. 4 is an exemplary block diagram for recording execution data of the computer program, according to some embodiments of the present invention.

In block 13, the RAS agent is configured as a stub to monitor a component of the application, while the application is running. For example, the user can select a component, such as, a class from the application source code (the application's object-oriented program) and a method (function) declared within that class. In one embodiment, the selection is performed visually using a graphical user interface (GUI) that has access to the application class files. If an active stub is desired, the user specifies the desired alternate behavior for the method when invoked by other methods or classes in the source code. Such stub behavior for the method could be used to return a predefined object instance, alter an object instance that is passed in to the method as an argument, alter application state, throw an exception object or a combination of these actions, as shown in FIG. 4.

In block 14, the application is exercised to perform one or more of certain tasks as declared by the application code, for example a button is pushed in a GUI if it is a rich client application, a hyper link is clicked if it is a Web application, or any one or more messages or events are triggered in order to execute a task. Such triggers may or may not be part of expected usage scenario for the application. The collected results are then validated (block 15), while the task is being performed, that is, on the fly.

The present invention leverages the simple yet powerful concept of stubs. A stub, in this context, is a piece of code (written in a regular programming language such as Java, C++, or with behavior defined declaratively without use of code, using a graphical interface) that is used to stand in for some other coded functionality. A stub can emulate the behavior of already-written code, or it can emulate the behavior of yet-to-be-written code. In the case of already-written code, using a stub has two benefits. First, a stub provides alternative behavior to the already-written code, allowing the system to be tested with different conditions. Secondly, if the already-written code is stateful, using a stub allows the system to be tested without undesirably altering the state of the already-written code. In the case in which the code is yet to be written, having a stub allows the system to function. This provides the benefit of allowing the system to be tested before the entire system has been implemented and integrated.

The present invention provides visibility and control over how the software components in the application under test communicate with the dependant entities without the need to disconnect, modify the code, shutdown/restart/recompile an entity, change the behavior of the dependant entities, and/or have such dependant entities available or running (they may be non-existent or yet-to-be-written) The present invention is capable of selecting the source code methods/functions to be stubbed, and specifying what behavior and return values are faked or simulated by these methods using active RAS stubs, while the application is executing during run-time. Additionally, the present invention is capable of merely monitoring the execution of the run-time of the program and validating it against an existing baseline, using passive RAS stubs. This is achieved without the need to recompile or restart the application.

A user may use the invention in an interactive manner to test a system manually, or configure the RAS stubs to operate in an automated testing process. For example, the invention may be used to drive the code with a unit testing framework (e.g. JUnit or NUnit), or use a functional testing tool to exercise the system's functionalities at run-time—automatically without direct user intervention. This allows the execution of a batch of test cases while for each test case the RAS stubs monitor the executed code or alter its behavior during execution. This enables automated regression testing under conditions not possible before, such as exercise application functionalities without all the dependant entities being present—automatically.

Figure 2:
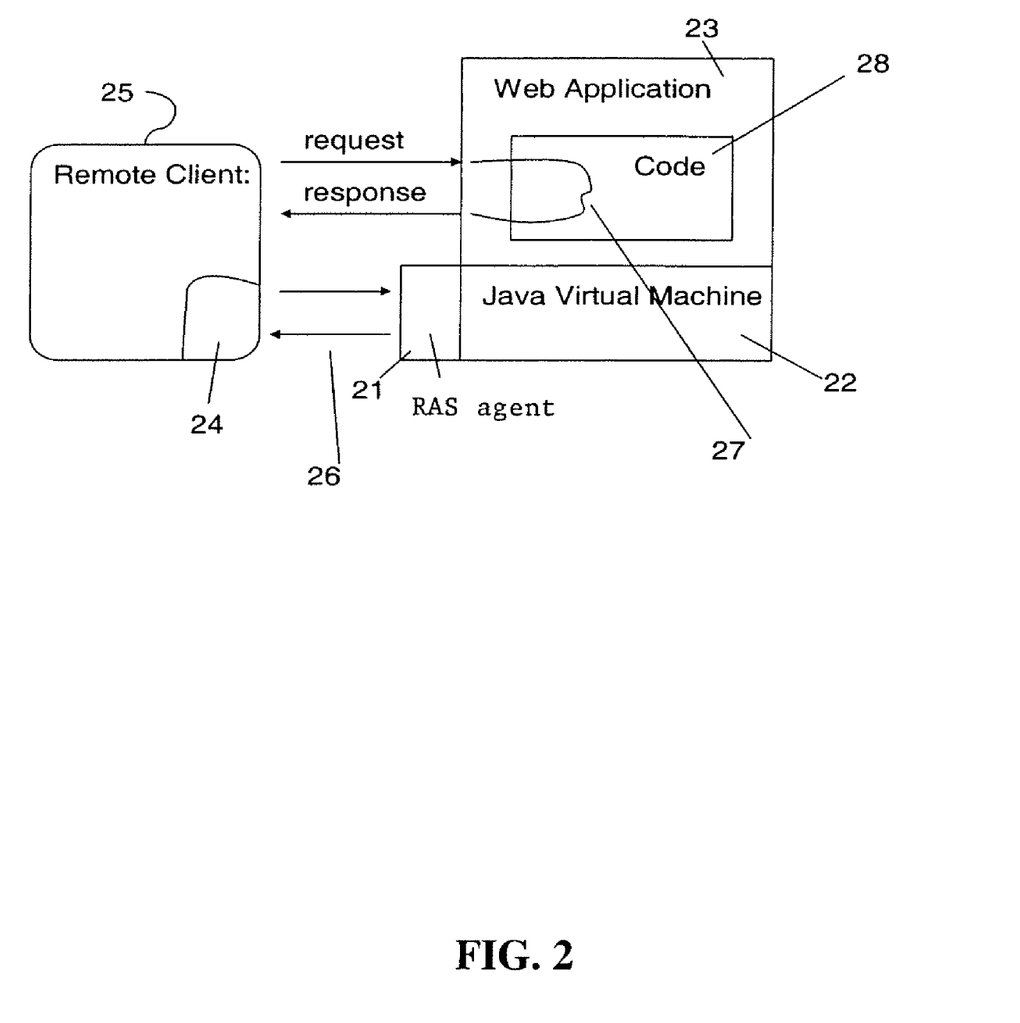
FIG. 2 is an exemplary system block diagram, according to some embodiments of the present invention.

FIG. 2 is an exemplary architectural block diagram of some embodiments of the system of the present invention. A remote client 25 instructs (controls) a monitoring program (RAS agent) 21, for example, in a JVM 22. The RAS agent 25 records each combination of inputs used when designated methods are invoked during live execution of an application. A RAS agent Controller 24 in the remote client 25 instructs the RAS agent when and what to record. Through a remote API (e.g., in the RAS agent), testers are able to choose when and what to record. The monitored artifacts 26 that capture execution path 27 through the code 28 are then returned to the remote client 25. U.S. patent application Ser. No. 11/396,168, entitled "System And Method For Test Generation," the entire context of which is hereby incorporated by reference, describes a monitoring program, such as a RAS agent in more detail.

The remote client can be other test tools, such as SOAtest™, and WebKing™ from Parasoft® Corp. For example, SOAtest™ is used if the web application is exposed as a web service, while WebKing™ may be used for typical web applications with a web interface. Users exercise the web application by sending requests to the web application through either SOAtest™ or WebKing™.

Figure 3:
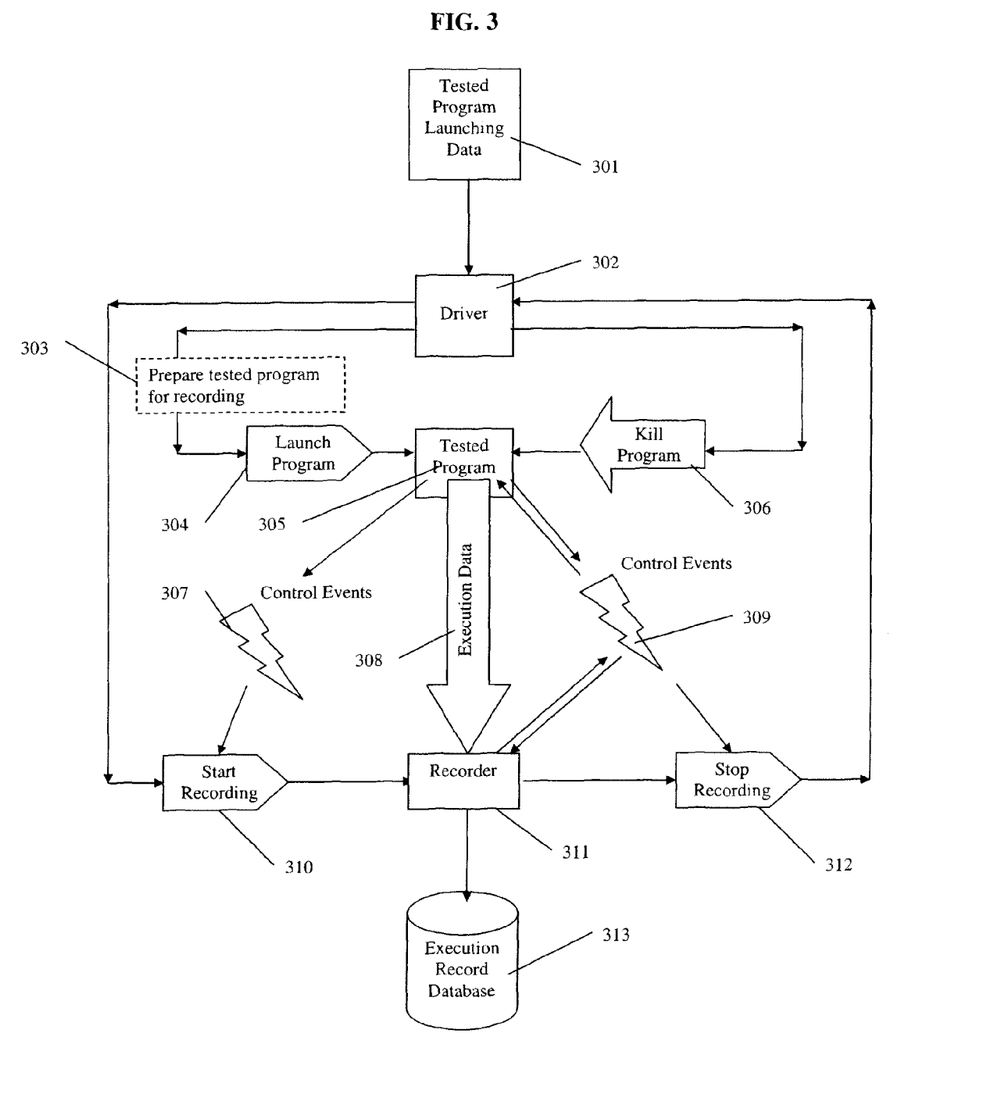
FIG. 3 is an exemplary block diagram for monitoring execution of a computer program and recording execution data, according to some embodiments of the present invention.

FIG. 3 is an exemplary block diagram for monitoring execution of a computer program, for example a web application and recording execution data, according to some embodiments of the present invention. A driver program 302 is launched with a Tested Program Launching Data 301. This data describes to a driver, for example, a remote client 302 how to set the environment and what parameters to pass to the tested program. The tested program is prepared for recording (303) by enabling the runtime system and providing runtime program information required to record program stats. This may be done, for example, by instrumenting source or binary code of the tested program, by enabling debugging interfaces of the program type to access runtime values, profiling interfaces available for the given program type for notification of runtime events, or by using a combination of the above. The program may be prepared, for example, before launching, while it is being loaded into the memory, or when a particular part of the program is about to be executed.

For example, data can be acquired for processes ran on Java VM using Debugger Interface (DI), Profiler Interface (PI), or Tool Interface (TI) for Sun Microsystem's™ Java Development Kit™ (JDK). Alternatively, the source or the binary code can be instrumented. Also, the combination of the above mentioned data acquisition means can be employed. Such profiling interfaces provide data about method invocation sequence and argument values. For Java applications, these interfaces are known as Java Virtual Machine Profiler Interface (JVMPI), Java Virtual Machine Debugger Interface (JVMDI), and Java Virtual Machine Tools Interface (JVMTI)

The driver program then initializes a recorder module 311. Control events 307 and 309 are sent to the recorder. These events may be sent by the driver 302, the monitored program, or both. Example of control events include, "Start Recording" 310, and "Stop Recording" 312. Events also control the granularity of recorded data. For example, "Record method calls", "Record method calls and objects", "Stub-out method M and make it return object X", etc. Execution data 308 is then sent to the recorder 311.

Recorder 311 may send control events to the monitored program 305 or a RAS controller 302 (in this invention we were referring to the "driver" here as "RAS controller"). These events may be, for example, data granularity control events like, turning on/off object recording, execution control events like, "suspend execution" or "kill". Execution data is then processed by the recorder and stored in an Execution Record Database 312. The tested program is prepared for recording (303) by appending arguments for the launch to enable the required program type interfaces. The prepared program is then launched in 304, and terminated in 306.

FIG. 4 is an exemplary block diagram for recording execution data of a computer program, for example a web application, according to one embodiment of the present invention. As depicted, data necessary for recreating the state of the tested application, or of a part of the tested application 401, is recorded.

In one embodiment, the data includes

```
Record method calls (406) including
    Method data
        For each unique method type + name + signature record
            Invocation data (402, 403)
                Data uniquely identifying a thread in which the method
                is invoked
                Instance object on which the method was invoked (if
                instance method)
                    origin (the way to generate instance of the object
                    in its given state)
                method arguments
                order (place) of the method invocation amongst other
                method invocations (regardless of the thread)
        Method's return value (404)
    Method execution context information
        Information about the objects and processes the method would
        interact with, e.g., information about an application server the
        method will interact with
        Environmental variables information
Record object's calling sequence (calling sequence that lead to the creation
of the object in its current state) (407). For example,
    Object o = ObjectConstructor( );
    o.foo( );
    o.set(x);
```

In one embodiment, sequence is implied form the temporal recording of the sequence of calls, that is, no notion of child/parent calls is recorded per se, but rather, is implied from the recorded sequence). The Recorder Event Listener 405 writes events sequentially to the Execution Record Database 408, which preserves the order of events for later processing by a test generation system. The collected information is then sent to the remote client at the end of testing. That information can then be compared against a set of predefined expectations in order to determine whether execution of the application has been performed accurately.

In one embodiment, the RAS agent records method invocation events that were made by the QA analyst, at the code level. The necessary information to recreate the calling sequence/execution path is thus made available. The invention reads and correlates the method invocation events recorded in a result file as well as deserializing objects within the file. In one embodiment, relevant method invocation events such as, method entry, exit, call and called are considered.

These events are achieved through bytecode instrumentation. The first two, method entry and exit are used for calling sequences and recording of input parameters used so that the made method invocation can be recreated. There may be instances where stubs (i.e. placeholder method calls) are needed. The method call event specifies that a call is about to be made so that the test can stub the call to that method.

Figure 5:
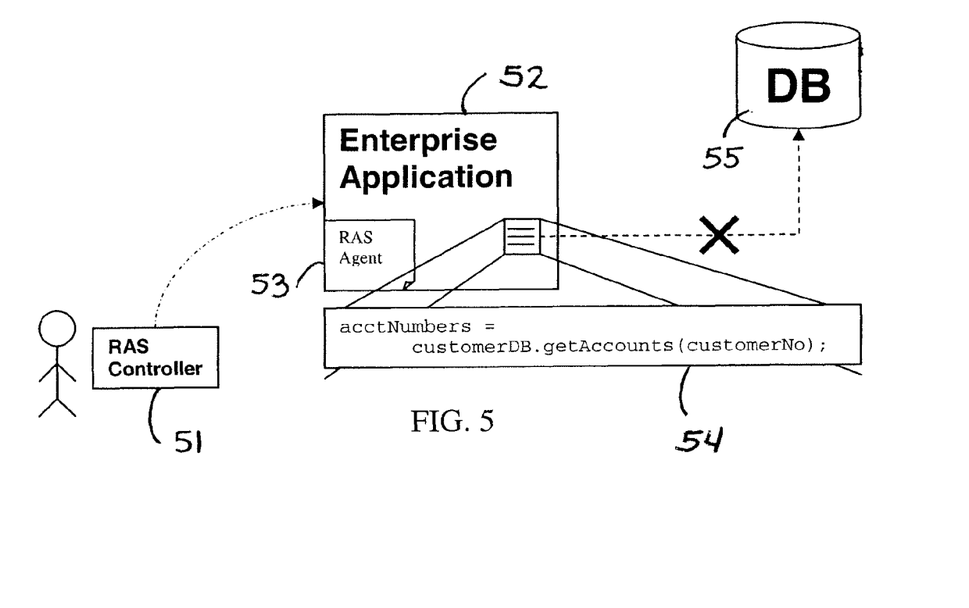
FIG. 5 is an exemplary block diagram for testing a database-related software, without invoking the database, according to some embodiments of the present invention; and FIG. 6

FIG. 5 is an exemplary block diagram for testing a database-related software, without invoking the database, according to some embodiments of the present invention. The example in FIG. 5 shows an application 52 that communicates with a relational database 55. The application is being tested via a RAS controller 51 and a RAS agent 53. Within the application, the code statement acctNumbers=customerDB.getAccounts(customerNo) 54 is executed to retrieve a list of account numbers from the database given a customer number value. As the application is being functionally tested, it is often required that the database-based calls return a number of different values depending on the use case scenarios that are being tested. The engineers working on the application may not have full control over the database as it could be managed by a different team or making changes to it can cause undesired ripple effects as different teams can be using it for different purposes at the same time.

However, since database transactions are executed from code statements similar to the above example, a RAS stub can be used to alter the statement execution in runtime so it does not invoke the real database backend, but rather mimic such an invocation. In the Example of FIG. 5, the user selects the "customerDB" class and the "getAccounts( )" method, and marks them as an active stub, then the user defines the desired stub behavior based on the value of the passed customerNo object, as the customerNo object is passed programmatically to the "getAccounts( )" as it gets called. For example, the user can configure the stub settings in such a way that "getAccounts( )" returns account number 1000 for customer number 1, account number 1001 for customer number 2, an empty accounts list for customer number 3 and throw an exception for customer number 4.

When the stub is enabled (by the RAS controller remotely instructing the RAS agent in the application to stub that method with the specified criteria), the user can execute functional tests that result in this customer numbers being passed in, and inspect the code behavior with the account number lists that are returned.

Stub behavior actions can be configured based on the method execution context. For example, a table can be used in the RAS controller to specify which object values the stub should produce for the stubbed method based on certain object values that are passed in as an argument as depicted in the example above. Once the desired stub behavior is defined, the stub configuration including but not limited to selected classes, methods and execution outcomes may be saved to a file so that the stub settings can be loaded for future RAS testing sessions.

Once the stub has been configured, the application is tested at run-time. The stub is controlled remotely using a RAS controller to exercise functional tests. In one embodiment, this is done from a testing tool (for example, Parasoft® SOAtest™ and WebKing™), which allows the user to switch the stub "on" and "off," reconfigure the stub by modifying any of the settings, or retrieve status and execution results of the stub from the RAS agent. This is done at run-time without the need to restart or redeploy the application. In one embodiment, controlling the stub remotely by the RAS controller is done using network sockets.

The user now runs functional tests against the application. The stub configuration data (optionally saved) can be used to create multiple stub configurations (or profiles) so that they can be applied to an executing application without the need to reconfigure all the settings details. Stub configuration profiles are applied or removed by the RAS controller, which is in turn driven by a user or an automated regression testing script (program).

Passive RAS stubs are similar in concept to active stubs, however, they are intended for passive monitoring of code execution at the stubbed classes and methods, rather than altering execution or simulating behaviors of these methods. When configured, passive RAS stubs are used for debugging application execution at run-time or regression testing. For regression testing, expected code behavior is provided, then as tests are executed, execution results are verified by the stub against that expected behavior.

The steps to configure and use passive stubs are similar to the steps taken to configure and use active stubs except that when the stubs is configured (block 24), the user specifies the expected behavior of the application's method execution outcomes, rather than altering its behavior. Such expected outcomes include the values in the objects returned by the method, exceptions thrown or changes in the objects passed to the method as arguments. The user then runs his or her functional test scenarios while monitoring the stubbed code execution and ensuring that it matches the expected outcomes. The RAS agent that is attached to the application reports the stubbed methods execution details to the RAS controller via network socket connections.

The RAS controller visualizes and tracks these results within a tool like SOAtest™ or WebKing™. The RAS controller compares the results against the predefined execution outcomes and thus determines the success or failure of the functional scenario tests. Expected execution outcomes are stored as regression controls within the stub configuration profile. In one embodiment, regression controls are declared manually by the user, or generated automatically from previous passive stub execution outcomes that are marked to be valid.

Figure 6:
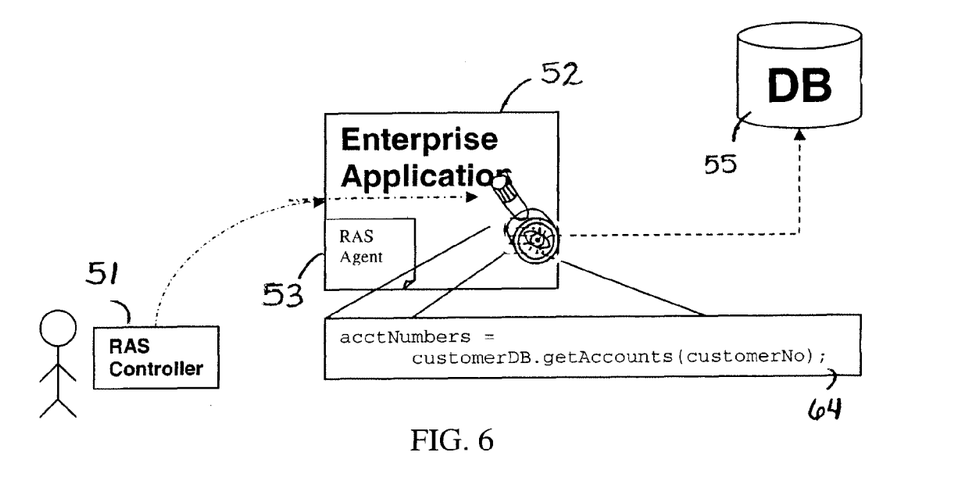
FIG. 6 is an exemplary block diagram for testing a database-related software, including invoking the database, according to some embodiments of the present invention.

FIG. 6 is an exemplary block diagram for testing a database-related software, including invoking the database, according to some embodiments of the present invention. FIG. 6 shows the same application 52 as previously described in FIG. 5, however, the goal here is to allow the statement acctNumbers=customerDB.getAccounts(customerNo) 64 execute naturally, that is, access the database and retrieve the account numbers without changing the statement behavior, however a RAS stub is configured to monitor this statement as a "passive" stub. The user then exercises the application using its interface (such as a Web interface using a Web browser) or by using a testing tool (for example, Parasoft® SOAtest™ and WebKing™) and which results in the statement execution. As the statement executes, the execution outcomes are monitored by the RAS Agent 53 and are returned to the RAS controller 53 so that the user can inspect the accuracy of execution.

For example, the RAS controller 51 confirms to the user that account number 1000 is returned for customer 1 and account number 1001 is returned for customer 2, etc. As these execution results are confirmed to be accurate, they can be set as a regression controls in the stub profile so that future executions are automatically verified against these expected return values, as part of regular regression testing activities.

In one embodiment, the present invention includes the automatic configuration of RAS profiles by discovering certain code APIs or patterns that are likely to be RAS candidates, namely, those code areas that communicate with systems outside the current application. These include, but are not limited to: JDBC, JMS, EJBs, IBM™ WebSphere™ MQ calls, TIBCO™, COM, CORBA™, plain socket connections and other standard or proprietary messaging APIs. The present invention scans the source code of the application for occurrences of statements that perform such remote calls and presents the statements to the user as candidates for stubbing. This allows users to quickly create stub profiles that control the level of isolation between the application and the outside world in order to simulate a production system environment as closely as possible within a development and test context.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for run time testing of a computer software application, the method comprising:
    attaching a Run-time Application Stubs (RAS) agent to the software application to be tested;
    running the software application with the attached RAS agent;
    configuring the RAS agent to monitor a component of the software application to collect results, while the software application is being executed;
    exercising the software application to perform a task; and
    recording a first set of calls to every function in the software application including arguments passed to the functions and return values by the functions, while the task is being performed by the software application;
    re-exercising the software application to perform the same task;
    recording a second set of calls to every function in the software application while the same task is being performed by the re-exercised software application;
    comparing the second set of calls to the first set of calls; and
    reporting an error when the second set of calls return different values from the first set of calls, to the same functions with the same arguments.

2. The method of claim 1, further comprising configuring the RAS agent to modify behavior of the component of the software application, while the software application is being executed.

3. The method of claim 1, wherein configuring the RAS agent comprises remotely configuring the RAS agent via a computer network.

4. The method of claim 1, further comprising displaying the validated results on a computer screen.

5. The method of claim 1, wherein the component of the software application is one or more method.

6. The method of claim 1, wherein the component of the software application is one or more function.

7. The method of claim 1, wherein the component of the software application is one or more statement.

8. The method of claim 2, further comprising performing regression testing of the software application using the validated results.

9. The method of claim 8, wherein regression testing of the software application is performed while the behavior of the component is being modified by the RAS agent.

10. The method of claim 1, further comprising specifying the type of information to collect.

11. The method of claim 1, wherein the collected results includes objects calling sequence, wherein the objects calling sequence is implied from temporal recording of sequence of calls from the exercising of the software application.

12. The method of claim 1, wherein configuring the RAS agent to monitor a component of the software application comprises configuring the RAS agent to profile interfaces available for a given program type to provide data about method invocation sequence and argument values.

13. A system for run time testing of a computer software application comprising:
   means for attaching a Run-time Application Stubs (RAS) agent to the software agent to the application to be tested;
   means for running the software application with the attached RAS agent;
   means for configuring the RAS agent to monitor a component of the software application to collect results, while the software application is being executed;
   means for exercising the application to perform a task; and
   means for recording a first set of calls to every function in the software application including arguments passed to the functions and return values by the functions, while the task is being performed by the software application, wherein the software application is re-exercised to perform the same task and a second set of calls to every function in the software application is recorded while the same task is being performed by the re-exercised software application;
   means for comparing the second set of calls to the first set of calls; and
   means for reporting an error when the second set of calls return different values from the first set of calls, to the same functions with the same arguments.

14. The system of claim 13, further comprising means for configuring the RAS agent to modify behavior of the component of the software application, while the application is being executed.

15. The system of claim 13, wherein means for configuring the RAS agent comprises means for remotely configuring the RAS agent via a computer network.

16. The system of claim 13, further comprising means for displaying the validated results on a computer screen.

17. The system of claim 13, wherein the component of the software application is one or more of a group consisting of a method, a function, and a statement.

18. The system of claim 14, further comprising means for performing regression testing of the software application using the validated results.

19. The system of claim 18, wherein means for regression testing of the software application is configured to performed the regression testing while the behavior of the component is being modified by the RAS agent.

20. The system of claim 13, further comprising means for specifying the type of information to collect.

* * * * *

UNITED STATES PATENT AND TRADEMARK OFFICE
CERTIFICATE OF CORRECTION

| | | |
|---|---|---|
| PATENT NO. | : 7,721,154 B1 | Page 1 of 1 |
| APPLICATION NO. | : 11/849907 | |
| DATED | : May 18, 2010 | |
| INVENTOR(S) | : Rami Jaamour et al. | |

It is certified that error appears in the above-identified patent and that said Letters Patent is hereby corrected as shown below:

In the Claims

Column 10, line 22, Claim 19       Delete "performed",
                                   Insert --perform--

Signed and Sealed this

Fourteenth Day of September, 2010

David J. Kappos
*Director of the United States Patent and Trademark Office*